Patented Feb. 8, 1949

2,461,336

UNITED STATES PATENT OFFICE 2,461,336

MANUFACTURE OF GLUTARIC ACID

Louis A. Mikeska, Westfield, N. J., assignor to Standard Oil Development Company, a corporation of Delaware No Drawing. Application April 1, 1946, Serial No. 658,877

9 Claims. (Cl. 260—537)

This invention pertains to a novel method of preparing glutaric acid and substituted glutaric acids. This application is a continuation in part of my copending application, Serial No. 500,843, filed September 1, 1943, now abandoned.

Glutaric acid, COOH—$CH_2CH_2CH_2$COOH, is a constituent of the grease of sheep wool and is present also in beets. Several methods of synthesizing this acid have been suggested, for example, the Knoevenagel method using diethylmalonate and Formalin; by the oxidation of cyclopentanone; and by the oxidation of 1.5-pentanediol with 2% alkaline potassium permanganate solution at room temperature. In spite of these methods of synthesizing glutaric acid, it is not obtainable on the market today except as a rare chemical at high cost.

It is the object of this invention to provide the art with a novel method of preparing glutaric acid and substituted glutaric acids.

It is also the object of this invention to prepare glutaric acid and substituted glutaric acids from readily available materials and by a simple procedure that forms the desired acid in pure form and in high yields.

These and other objects will appear more clearly from the detailed description and claims which follow.

It has now been found that glutaric acid and substituted glutaric acids may be prepared in good yields and in pure form from the condensation products of acrylonitrile with esters corresponding to the general formula

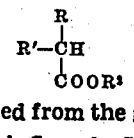

wherein R is selected from the group consisting of alkyl—C— and —COOR²
‖
O

R¹ stands for hydrogen or an aliphatic group and R² stands for an alkyl group.

The reactions involved in this condensation proceed with the formation of both mono- and polymolecular addition products of the acrylonitrile, as follows:

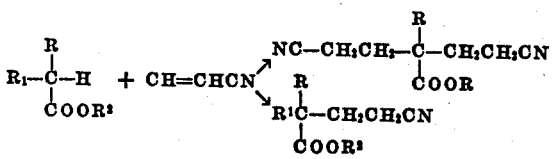

The conversion of the mononitrile to a glutaric acid proceeds with the rupture of the R-C bond and hydrolysis of the ester as follows:

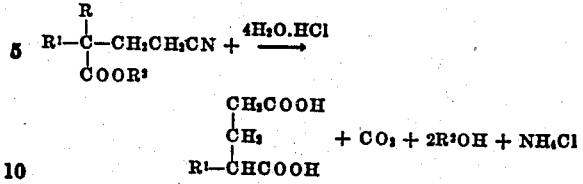

wherein R, R¹ and R² have the meaning given above.

The entire preparation is quite simple. The ester is treated with about one-quarter of one percent of an alkaline condensing agent such as metallic sodium or potassium, an amine or an onium base whereupon the acrylonitrile is added with sufficient cooling to keep the temperature below 85° C. The reaction is over in less than an hour, whereupon the excess acrylonitrile and unreacted ester is then flashed off and the residue is distilled under reduced pressure. If desired, the reaction mixture may be neutralized previous to distillation, with enough acetic acid to react with the alkaline condensing agent. The mononitrile is obtained in 80-90% yield based on the acrylonitrile converted and the dinitrile is obtained in 10-20% yield. The yield of the dinitrile could be increased by increasing the ratio of acrylonitrile to the ester in the original reaction.

The condensation product is converted to a glutaric acid by heating it with a strong aqueous hydrolyzing agent such as a strong aqueous acid (HCl, HBr, $H_2SO_4$, etc.) or a strong aqueous alkali (NaOH, KOH, LiOH, etc.). For example, the condensation product may be heated with an equal volume of concentrated hydrochloric acid. Pure glutaric acid may be thus obtained in better than 90% yield from the mononitrile condensation product with diethyl malonate. If the dinitrile is similarly heated with HCl, tricarballylic acid can be obtained.

The esters which may be used in accordance with the present invention include diethyl malonate and other esters of malonic acid, such as the methyl, propyl or butyl esters and aceto acetic acid esters, such as methyl-, ethyl-, propyl- or butyl aceto acetate. If substituted esters such as alpha-n-butyl-diethyl malonate, alpha-benzyl-diethyl malonate, alpha-cetyl-diethyl malonate, alpha-n-butyl-ethyl aceto acetate, alpha-benzyl-ethyl aceto acetate or alpha-cetyl-ethyl aceto acetate, are used it is possible to make the corresponding substituted glutaric acids.

The alkaline condensing agents which may be used in the initial condensation with acrylonitrile include metallic sodium or potassium, also sodium, potassium or ammonium hydroxides, amines, preferably tertiary amines such as tertiary ethylamine, tertiary butyl amine, dimethyl aniline, diethyl aniline and onium bases such as cetyl trimethyl ammonium, sulfonium or phosphonium hydroxides.

The following examples are illustrative of the present invention:

*Example 1.—Glutaric acid*

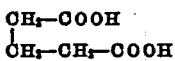

A glass reactor equipped with a stirrer, a thermometer, a return condenser and a dropping funnel was charged with 160 grams of diethyl malonate, to which was then added 1 gram of metallic sodium.

When all the sodium had dissolved, 53 gms. of acrylonitrile was added by means of the dropping funnel, drop by drop, with rapid stirring and just enough cooling to keep the reaction temperature below 85° C. When all the acrylonitrile had been added, the reaction mixture was heated with stirring, at 85° C. for another hour.

The mixture was then cooled. Enough glacial acetic acid was added to neutralize the sodium. The reaction mixture was then distilled under 3 m. m. pressure.

15 gms. of unchanged acrylonitrile and 53 gms. of diethyl malonate were recovered.

The reaction product yielded 187 gms. of the mononitrile boiling at 127°–130° C. and 20 gms. of the dinitrile boiling at 160°–170° C. The dinitrile solidified on standing. After one recrystallization from acetone it melted at 61° C.

The mononitrile was mixed with an equal weight of concentrated aqueous hydrochloric acid of 36 weight per cent HCl, and was heated on the steam bath over night, during which $CO_2$ was evolved. The next day the solution was cooled and filtered to remove the precipitated ammonium chloride. The filtrate was evaporated to dryness under partially reduced pressure.

The residue was taken up with ether and filtered off from the precipitated ammonium chloride. On removal of the ether from the filtrate, the residue was distilled under 3 m. m. pressure. The entire product boiled at 166° C. Total yield=94 gms., which corresponds to 80% of the theoretical yield of glutaric acid. This distillate consisted of a snow white solid which melted at 97.5° C.

In lieu of hydrolyzing and cracking the nitrile under acid conditions, as shown above, an alkaline treatment may also be applied, as shown by the following data:

*Example II*

A round bottom flask equipped with a return condenser was charged with 107 gms. of cyanoethyl-diethyl malonate and 500 cc. of water containing 60 gms. of sodium hydroxide. The mixture was heated on the steam bath over night.

The product was transferred into a distilling flask and most of the water was removed. The residue was acidified with 130 cc. of concentrated hydrochloric acid. The product was then evaporated to dryness under reduced pressure.

The residue which consisted of a mixture of glutaric acid and sodium chloride was extracted several times with ethyl ether. The ether extracts were combined and evaporated to dryness. The residue consisted of a 58 gms. white crystalline material, which corresponds to 90% of the theoretical yield of glutaric acid. On recrystallization from a mixture of ether and petroleum ether, the product melted at 97.5° C.

Instead of the ether extraction the glutaric acid may be separated from the sodium chloride and other by-products by distillation under reduced pressure.

*Example III.—Cyanoethyl-n-amylacetoacetate*

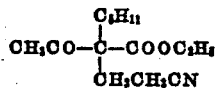

A 3-way flask equipped with a mechanical stirrer, a return condenser and a thermometer was charged with 80 gms. of n-amyl-ethylacetoacetate and 3 cc. of 40% aqueous solution of benzyl-trimethyl ammonium hydroxide. The dropping funnel was charged with 24 gms. of acrylonitrile. The latter was then added to the reactor drop by drop with rapid stirring and just enough cooling to keep the reaction temperature below 60° C. The mixture was then heated at 100° C. for 3 hours with rapid stirring. When the reaction was completed, the product was cooled and poured into ice water. The cyano derivative was extracted with ether, washed free of the catalyst, and finally dried over sodium sulfate. After removal of the ether, the product was distilled under 1 m. m. pressure. Two fractions were obtained, one (34 grams) distilling at 85°–155° C., while the other (45 grams) distilled at 155°–165° C. The second fraction analyzed as follows:

Found: C=67.11%  H=9.38%  N=5.52%
$C_{14}H_{25}O_2N$ Calc.: C=66.40%  H=9.09%  N=5.53%

*N-amyl glutaric acid*

$$C_5H_{11}-CH-COOH$$
$$CH_2-CH_2-COOH$$

The above described cyanoethyl acetoacetate was converted into n-amyl glutaric acid as follows:

A round bottom flask was charged with 30 gms. potassium hydroxide and 70 cc. of absolute alcohol. To this was then added 45 gms. of the above described cyanoethyl-n-amyl-acetoacetate. The mixture was refluxed for 4 hours whereupon it was transferred into a porcelain dish and evaporated to dryness on the steam bath. The residue consisted of a white solid material readily soluble in water. The salt was dissolved in water and acidified with concentrated hydrochloric acid. The n-amyl glutaric acid separated as an oil. This acid was extracted several times with ether. All the ether extracts were combined, washed twice with a little water and dried over sodium sulfate. On removal of the ether, the residue weighed 35 gms. and consisted of a dark red oil. The latter was distilled under 3 m. m. pressure. The major portion of the product (25 gms.) distilled at 193°–197° C. The distillate consisted of pure n-amyl glutaric acid as may be seen from the following analysis:

Found: C=59.66%  H=8.99%
$C_{10}H_{18}O_4$ Calc.: C=59.40%  H=8.91%

*Example IV.—Diethyl alpha-cyanoethyl-alpha-n-butyl malonate*

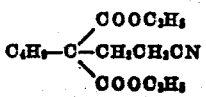

A 3-way flask equipped with a mechanical stirrer, a return condenser, a thermometer and a dropping funnel, was charged with 100 gms. of alpha-n-butyl ethyl malonate. To this was then added about ½ gram metallic sodium.

The dropping funnel was charged with acrylonitrile. When all the sodium had dissolved, the nitrile was added to the reactor drop by drop with rapid stirring and just enough cooling to keep the reaction temperature below 50° C. When all the acrylonitrile had been added, the mixture was heated to 80° C. and kept at that temperature for 1 hour.

The reaction mixture was then cooled, poured into water and acidified. The reaction product was then extracted with ether, washed, and dried over sodium sulfate. On removal of the ether, 68 gms. of an oily residue was obtained which was distilled under 3 m. m. pressure. The entire product distilled at 145°–147° C. It analyzed as follows:

Found: $C=63.02\%$ $H=8.38\%$ $N=5.09\%$
$C_{14}H_{25}O_4N$ Calc.: $C=62.45\%$ $H=8.55\%$ $N=5.20\%$

*N-butyl glutaric acid*

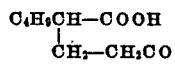

A round bottom flask was charged with 28 gms. of diethyl alpha-cyanoethyl-alpha-n-butyl malonate (described above) and 16 grams of potassium hydroxide dissolved in 200 cc. of 50% ethyl alcohol. The mixture was refluxed for 12 hrs., whereupon it was evaporated to dryness on the steam bath. The residue was then acidified with hydrochloric acid and evaporated to dryness. The semicrystalline product thus obtained was then distilled under 3 m. m. pressure. 17 gms. of a material boiling between 170–180° C. were obtained. The product consisted of a very viscous colorless oil which proved to be practically pure n-butyl glutaric acid as may be seen from the acid value given below:

0.3116 gm. of the product consumed 30.8 cc. of 0.1018 N NaOH. Hence, the acid was 94.7% pure.

The foregoing description and examples are intended to be only illustrative of the present invention. It will be obvious to those skilled in the art that numerous variations are possible without departing from the purview of this invention as defined in the following claims.

What I claim and desire to secure by Letters Patent is:

1. The process of preparing a glutaric acid which comprises subjecting a mononitrile condensation product, having the formula

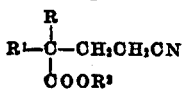

in which R is a carbonyl radical selected from the group consisting of

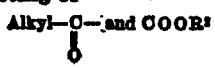

$R^1$ is one of the group consisting of hydrogen and an aliphatic group and $R^2$ is an alkyl group, to heat in the presence of a hydrolyzing agent, thereby hydrolyzing the nitrile radical and splitting off the carbonyl radical and forming a glutaric acid.

2. Process according to claim 1, in which the said hydrolyzing agent is an aqueous acid.

3. Process according to claim 1, in which the said hydrolyzing agent is aqueous hydrochloric acid.

4. Process according to claim 1, in which the hydrolyzing agent is an aqueous alkali.

5. Process according to claim 1, in which the hydrolyzing agent is aqueous sodium hydroxide.

6. The process of preparing a glutaric acid which comprises subjecting the mononitrile condensation product of a malonic acid ester with acrylonitrile to heat in the presence of a hydrolyzing agent, thereby hydrolyzing the nitrile radical and splitting off one carboxyl radical and forming a glutaric acid.

7. The process of preparing glutaric acid which comprises subjecting the mononitrile condensation product of diethyl malonate with acrylonitrile to heat in the presence of a hydrolyzing agent, thereby hydrolyzing the nitrile radical and splitting off one carboxyl radical and forming glutaric acid.

8. The process of preparing a glutaric acid which comprises subjecting the mononitrile condensation product of an aceto acetic acid ester with acrylonitrile to heat in the presence of a hydrolyzing agent, thereby hydrolyzing the nitrile radical and splitting off one carbonyl radical and forming a glutaric acid.

9. The process of preparing glutaric acid which comprises subjecting the mononitrile condensation product of ethyl aceto acetic acid with acrylonitrile to heat in the presence of a hydrolyzing agent, thereby hydrolyzing the nitrile radical and splitting off the acetyl radical and forming glutaric acid.

LOUIS A. MIKESKA.

REFERENCES CITED

The following references are of record in the file of this patent:

UNITED STATES PATENTS

| Number | Name | Date |
|---|---|---|
| 1,873,732 | Adams | Aug. 23, 1932 |
| 2,329,433 | Bruson | Sept. 14, 1943 |
| 2,396,626 | Wiest et al. | Mar. 12, 1946 |

OTHER REFERENCES

Karrer: Organic Chemistry (Eng. trans. by Mee), 1938, Nordemann Pub. Co., New York, pp. 168, 183, 251.

Ser. No. 374,864, Wiest (A. P. C.), published June 15, 1943.